(12) United States Patent
Hashimoto et al.

(10) Patent No.: US 11,167,403 B2
(45) Date of Patent: Nov. 9, 2021

(54) ELECTRIC WORKING MACHINE

(71) Applicant: HITACHI KOKI CO., LTD., Tokyo (JP)

(72) Inventors: Hideyuki Hashimoto, Ibaraki (JP); Satoshi Abe, Ibaraki (JP); Shingo Yamazaki, Ibaraki (JP); Tomomasa Nishikawa, Ibaraki (JP); Akira Matsushita, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 944 days.

(21) Appl. No.: 15/505,597

(22) PCT Filed: Aug. 21, 2015

(86) PCT No.: PCT/JP2015/073537
§ 371 (c)(1),
(2) Date: Feb. 21, 2017

(87) PCT Pub. No.: WO2016/031719
PCT Pub. Date: Mar. 3, 2016

(65) Prior Publication Data
US 2017/0246735 A1 Aug. 31, 2017

(30) Foreign Application Priority Data
Aug. 29, 2014 (JP) .............................. JP2014-176378

(51) Int. Cl.
*B25D 11/04* (2006.01)
*B25D 11/12* (2006.01)
(Continued)

(52) U.S. Cl.
CPC ............. *B25D 11/04* (2013.01); *B25D 11/12* (2013.01); *B25F 5/00* (2013.01); *B25F 5/008* (2013.01);
(Continued)

(58) Field of Classification Search
CPC ... B25D 11/04; B25D 11/12; B25D 2211/068; B25D 2250/095; B25D 2250/221;
(Continued)

(56) References Cited

U.S. PATENT DOCUMENTS 6,909,207 B2  6/2005  Ikeda et al.
8,587,167 B2 * 11/2013  Kado ........................ H02K 5/08
                                                       310/68 R
(Continued)

FOREIGN PATENT DOCUMENTS

CN       1423393 A      6/2003
DE    43 41 753 A1      6/1995
(Continued)

OTHER PUBLICATIONS

Chinese Office Action issued in corresponding Chinese Patent Application No. 201580045046.8, dated Dec. 25, 2018, with English Translation
(Continued)

*Primary Examiner* — Hemant Desai
*Assistant Examiner* — Mobeen Ahmed
(74) *Attorney, Agent, or Firm* — McDermott Will & Emery LLP

(57) ABSTRACT

The present invention provides an electric working machine in which a control board can be disposed without limitations based on a length of a brushless motor in a direction along an axial line. The electric working machine comprises: a brushless motor provided with a rotor and a stator; a motor case and a motor housing in which the brushless motor is stored; a control board which is provided outside of the motor housing in a radial direction of an axial line defined at the center of the rotor, and supports the switching elements; a connection board which is provided in the motor case, and supports the sensors; a through hole provided on
(Continued)

the motor case; a through hole provided on the motor housing; and leads and signal lines extending from inside of the motor housing to the outside of the motor housing through the holes.

5 Claims, 8 Drawing Sheets

(51) Int. Cl.
  H02K 11/21 (2016.01)
  H02P 6/17 (2016.01)
  H02K 5/22 (2006.01)
  H02K 9/06 (2006.01)
  H02P 27/08 (2006.01)
  B25F 5/00 (2006.01)
  H02K 11/33 (2016.01)
  B25F 5/02 (2006.01)
  H02K 11/00 (2016.01)

(52) U.S. Cl.
  CPC ............. *B25F 5/02* (2013.01); *H02K 5/225* (2013.01); *H02K 9/06* (2013.01); *H02K 11/00* (2013.01); *H02K 11/21* (2016.01); *H02K 11/33* (2016.01); *H02P 6/17* (2016.02); *H02P 27/08* (2013.01); *B25D 2211/068* (2013.01); *B25D 2250/095* (2013.01); *B25D 2250/221* (2013.01)

(58) Field of Classification Search
  CPC .......... H02K 11/33; H02K 5/225; H02K 9/06; H02K 11/21; H02K 11/00; H02P 6/17; H02P 27/08; B25F 5/008; B25F 5/02; B25F 5/00
  See application file for complete search history.

(56) References Cited

U.S. PATENT DOCUMENTS

| | | | | |
|---|---|---|---|---|
| 9,077,230 | B2* | 7/2015 | Lau | H02K 11/33 |
| 9,676,408 | B2* | 6/2017 | Tominaga | H02K 5/225 |
| 2003/0107273 | A1* | 6/2003 | Ikeda | H02K 5/08 |
| | | | | 310/43 |
| 2003/0107278 | A1* | 6/2003 | Agnes | H02K 3/345 |
| | | | | 310/89 |
| 2004/0017119 | A1* | 1/2004 | Yamamoto | H02K 29/08 |
| | | | | 310/68 B |
| 2006/0255756 | A1* | 11/2006 | Iwata | B25F 5/008 |
| | | | | 318/400.41 |
| 2008/0265695 | A1* | 10/2008 | Yoshida | H02K 7/145 |
| | | | | 310/50 |
| 2010/0253162 | A1* | 10/2010 | Sakamaki | B25D 16/00 |
| | | | | 310/50 |
| 2011/0056716 | A1* | 3/2011 | Jonsson | H02P 6/04 |
| | | | | 173/217 |
| 2011/0079407 | A1* | 4/2011 | Iimura | B25B 23/1475 |
| | | | | 173/2 |
| 2011/0100665 | A1* | 5/2011 | Nakashima | B23D 51/01 |
| | | | | 173/162.2 |
| 2011/0227430 | A1* | 9/2011 | Omori | H02K 11/215 |
| | | | | 310/50 |
| 2012/0014065 | A1 | 1/2012 | Haga et al. | |
| 2012/0031638 | A1* | 2/2012 | Kamegai | B25D 17/245 |
| | | | | 173/162.2 |
| 2013/0000936 | A1 | 1/2013 | Onoda et al. | |
| 2013/0313925 | A1* | 11/2013 | Mergener | H02K 11/33 |
| | | | | 310/50 |
| 2014/0132093 | A1* | 5/2014 | Purohit | H02K 21/12 |
| | | | | 310/50 |
| 2014/0175912 | A1* | 6/2014 | Germann | H02K 3/522 |
| | | | | 310/43 |
| 2014/0182869 | A1* | 7/2014 | Kumagai | B25F 5/02 |
| | | | | 173/93 |
| 2015/0069864 | A1* | 3/2015 | Nagahama | B25F 5/008 |
| | | | | 310/50 |
| 2015/0280517 | A1* | 10/2015 | Ekstrom | B25F 5/008 |
| | | | | 173/170 |
| 2015/0303842 | A1* | 10/2015 | Takano | H02P 6/30 |
| | | | | 173/2 |
| 2015/0318762 | A1* | 11/2015 | O | H02K 7/14 |
| | | | | 310/43 |
| 2015/0364972 | A1 | 12/2015 | Ito | |
| 2015/0364973 | A1* | 12/2015 | Tadokoro | H02K 11/33 |
| | | | | 310/50 |
| 2016/0008961 | A1* | 1/2016 | Takano | B25B 23/1475 |
| | | | | 173/2 |
| 2016/0149463 | A1* | 5/2016 | Smith | H02K 1/28 |
| | | | | 310/50 |
| 2017/0246735 | A1* | 8/2017 | Hashimoto | H02K 11/33 |
| 2017/0288509 | A1* | 10/2017 | Oya | H02K 11/00 |
| 2017/0305457 | A1* | 10/2017 | Koike | B62D 5/0406 |
| 2018/0127020 | A1* | 5/2018 | Asao | H02K 11/00 |

FOREIGN PATENT DOCUMENTS

| | | |
|---|---|---|
| JP | 2000-052279 A | 2/2000 |
| JP | 2004-007869 A | 1/2004 |
| JP | 2012-020363 A | 2/2012 |
| JP | 2012-257452 A | 12/2012 |
| JP | 2013-013960 A | 1/2013 |
| JP | 2013-094866 A | 5/2013 |
| JP | 2014-138971 A | 7/2014 |
| JP | 2014-200884 A | 10/2014 |
| WO | 02/081153 A1 | 10/2002 |

OTHER PUBLICATIONS

Extended European Search Report issued in corresponding EP Patent Application No. 15835365.6, dated Apr. 18, 2018.
Search Report issued in corresponding International Patent Application No. PCT/JP2015/073537, dated Oct. 13, 2015.
Office Action issued in corresponding Japanese Patent Application No. 2016-545499, dated May 15, 2018.
Office Action issued in corresponding Japanese Patent Application No. 2016-545499, dated Oct. 23, 2017.

* cited by examiner

ELECTRIC WORKING MACHINE

CROSS REFERENCE

This application is the U.S. National Phase under 35 U.S.C. § 371 of International Application No. PCT/JP2015/073537, filed on Aug. 21, 2015, which claims the benefit of Japanese Application No. 2014-176378, filed on Aug. 29, 2014, the entire contents of each are hereby incorporated by reference.

TECHNICAL FIELD

The present invention relates to an electric working machine which works by transmitting a driving power of an electric motor to a tip tool.

BACKGROUND ART

Patent Document 1 has disclosed an electric working machine which transmits a driving power of an electric motor to a tip tool. The electric working machine described in Patent Document 1 comprises a housing which has a motor housing, a gear case, and a handle housing. The handle housing is bent into an L-shape; a first end portion of the handle housing is in contact with the motor housing, and a second end portion of the handle housing is in contact with the gear case. A brushless motor is provided in the motor housing. The brushless motor has a rotating shaft, a rotor, a stator, and a circuit board. The rotor is rotatable with the rotating shaft around a rotation axis. The circuit board is provided with a Hall element which detects the rotational position of the rotor.

A board chamber is provided in the first end portion of the handle housing, and a control board is provided in the board chamber. Switching elements are mounted on the control board. A power cable connects coils of the stator with the control board. Additionally, a communication cable connects the Hall elements with the control board. A rotational force transmission mechanism and a planetary gear mechanism are provided in the gear case, the planetary gear mechanism being power-transmittably connected to a socket serving as the tip tool. The rotational force transmission mechanism is power-transmittably connected to the rotating shaft.

RELATED ART DOCUMENT

Patent Document

Patent Document 1: Japanese Unexamined Patent Application Publication No. 2012-020363

SUMMARY OF THE INVENTION

Problems to be Solved by the Invention

However, in the electric working machine described in Patent Document 1, the control board is disposed in a position along the rotation axis of the electric motor. For this reason, arrangement positions of the control board have limitations based on the length of the brushless motor in the direction along the rotation axis.

An object of the present invention is to provide an electric working machine in which the control board can be disposed without limitations caused by the length of the electric motor in the direction along a rotation axis.

Means for Solving the Problems

An electric working machine according to one aspect of the present invention comprises: an electric motor comprising a rotor and a stator; and a tubular housing in which the electric motor is stored, wherein the electric working machine further comprises: a first control unit which is provided outside of the tubular housing in a radial direction of a rotation axis of the rotor, and which controls the electric motor; a second control unit which is provided in the tubular housing, and which controls the electric motor; a through hole on the tubular housing extending from the inside to the outside of the tubular housing; and an electric wire which connects the first control unit with the second control unit, and extends into the hole.

Effects of the Invention

According to one aspect of the present invention, the first control unit is disposed on the outside of a tubular housing in a radial direction of a rotation axial line defined at a center of the rotor. Therefore, the first control unit can be disposed without limitations caused by the length of the electric motor in the direction along the rotation axial line.

DETAILED DESCRIPTION OF PREFERRED EMBODIMENTS

Figure 1:
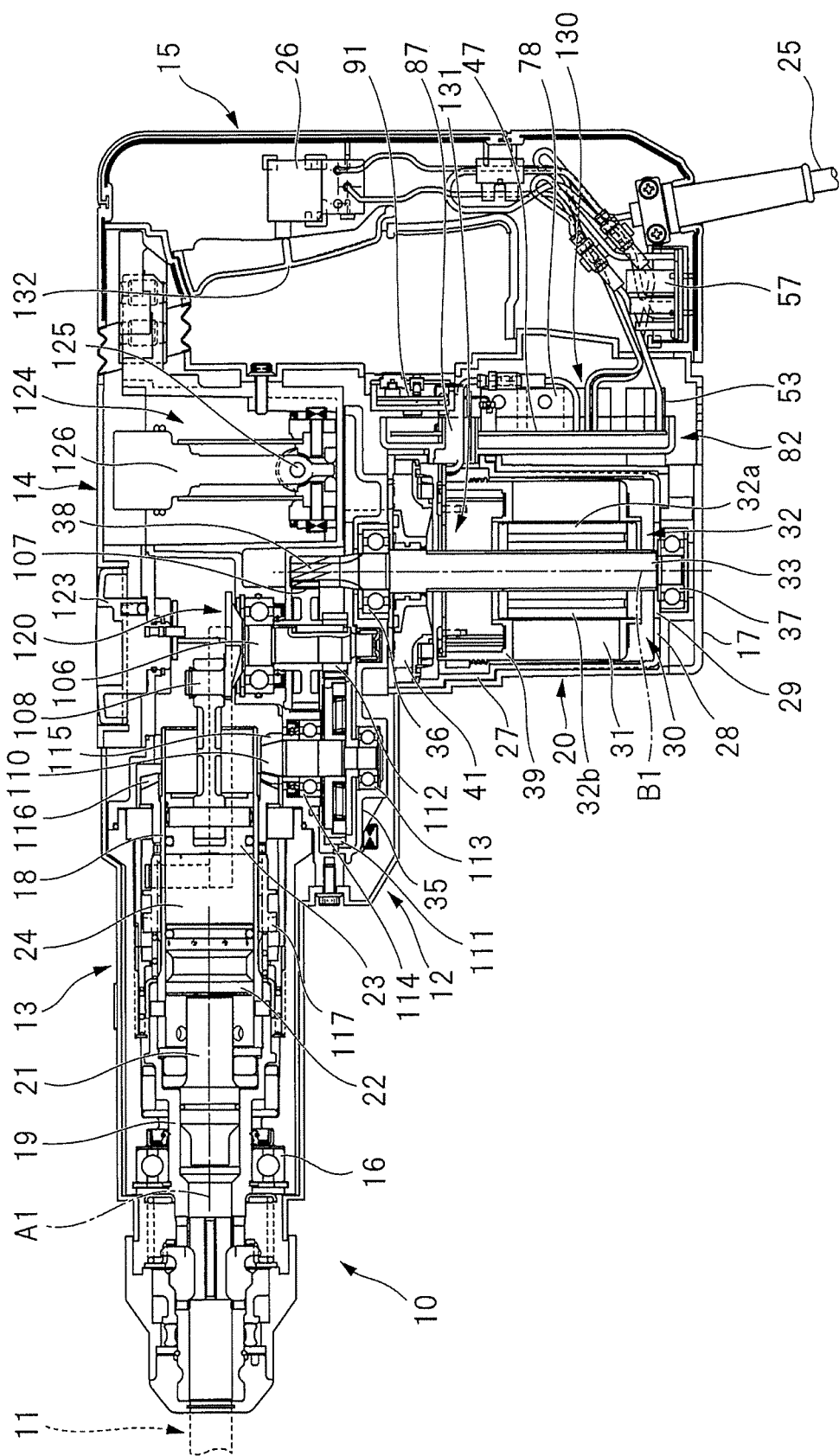
FIG. 1 is a cross-sectional front view showing an electric working machine according to one embodiment of the present invention.

Hereinafter, the embodiment of the present invention will be described in detail on the basis of FIGS. 1 to 8. A tip tool 11 is detachably attached to an electric working machine 10 which is also referred to as a "hammer drill". The electric working machine 10 is utilized to carry out processes such as drilling concrete and stone material.

The electric working machine 10 has a working machine main body 12, in which a cylinder housing 13, an intermediate case 14, a handle 15, a motor housing 20 and a bottom cover 17 are fixed to each other. The cylinder housing 13 is cylindrical in shape, and a cylinder 18 is provided in the cylinder housing 13. The cylinder 18 is disposed on an axial line A1 so as to be coaxial with a cylindrical tool holding member 19. The tool holding member 19 is provided in the cylinder housing 13, and is rotatably supported by a bearing 16. The cylinder 18 and the tool holding member 19 are integrally rotatably connected to each other. The tip tool 11 is attached to the tool holding member 19 so that a rotational force of the cylinder 18 is transmitted to the tip tool 11.

An intermediate hammering element 21 made of metal is provided in the tool holding member 19 extending into the cylinder 18. The intermediate hammering element 21 is reciprocatively movable in a direction along the axial line A1. A hammering element 22, which strikes the intermediate hammering element 21, is provided in the cylinder 18. The hammering element 22 is reciprocatively movable in the direction along the axial line A1. Additionally, a piston 23 is disposed in the cylinder 18, and is reciprocatively movable in the direction along the axial line A1. An air chamber 24 is provided in the cylinder 18, between the hammering element 22 and the piston 23.

The intermediate case 14 is disposed between the handle 15 and the cylinder housing 13 in the direction along the axial line A1. The motor housing 20 is fixed to both the cylinder housing 13 and the intermediate case 14. An arrangement region of the motor housing 20 in the direction along the axial line A1 partially overlaps an arrangement region of the intermediate case 14 in the direction along the axial line A1. The handle 15 is bent into an arch shape, and the two ends of the handle 15 are attached to the intermediate case 14. A lever 132 and a power cable 25 are attached to the handle 15. The handle 15 is also provided with an operation switch 26. When the user operates the lever 132, the operation switch 26 is turned ON or OFF.

Figure 6:
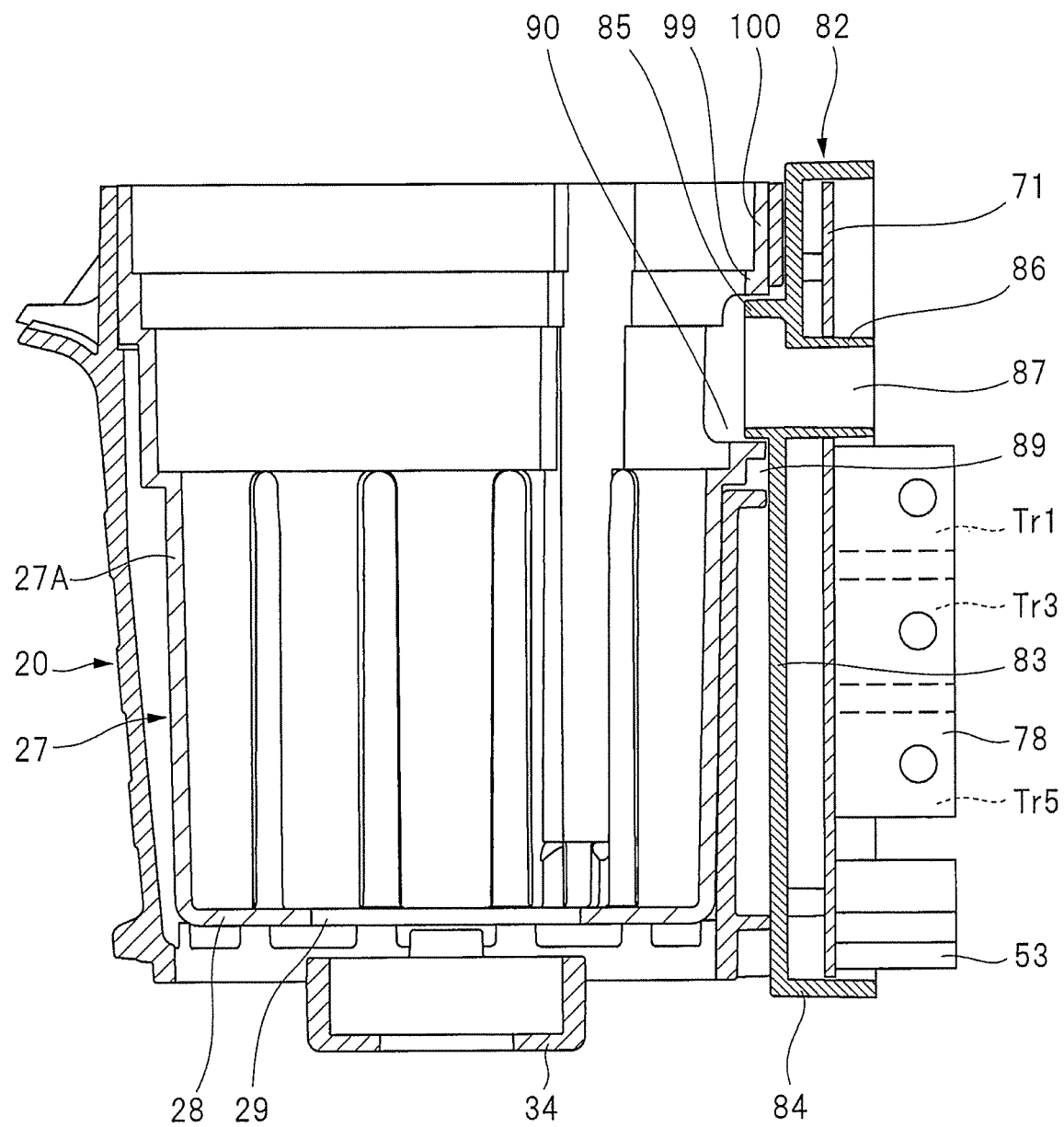
FIG. 6 is a cross-sectional view taken along a line VI-VI of FIG. 5.

The motor housing 20 is integrally molded and is made of conductive metal such as aluminum. The motor housing 20 is tubular in shape, and a motor case 27 is disposed in the motor housing 20. The motor case 27 is integrally molded and is made of insulating material such as synthetic resin. The motor case 27 has a tubular portion 27A as shown in FIG. 6, and the tubular portion 27A of the motor case 27 is press-fitted to the motor housing 20. The motor case 27 has a bottom portion 28 continuously connected to the tubular portion 27A, and the bottom portion 28 is provided with a shaft hole 29.

Furthermore, a brushless motor 30 is stored in the motor case 27. This brushless motor 30 is a direct current motor, and has a tubular stator 31 and a rotor 32 which is disposed in the stator 31. The rotor 32 comprises an output shaft 33 and a rotor core 32a which is fixed to the output shaft 33. In a front view of the electric working machine 10, an axial line B1 defined as a rotational center of the output shaft 33 intersects with the axial line A1 and, more specifically, is orthogonal to the axial line A1. The motor housing 20 is disposed between the bottom cover 17 and the intermediate case 14 in a direction along the axial line B1. The motor housing 20 comprises a bearing support portion 34 disposed on the bottom cover 17. A partition wall 35 is provided on the intermediate case 14 and extends into the cylinder housing 13; the intermediate case 14 has a bearing 36 supported by the partition wall 35 and a bearing 37 supported by the bearing support portion 34. The two bearings 36 and 37 are disposed at respective positions apart from each other along the axial line B1 of the output shaft 33. The first end of the output shaft 33 is disposed in the shaft hole 29, and the second end of the output shaft 33 is disposed in the intermediate case 14. The output shaft 33 has a portion which is partially disposed in the intermediate case 14, and a driver gear 38 is provided on the outer periphery of this portion.

Figure 3:
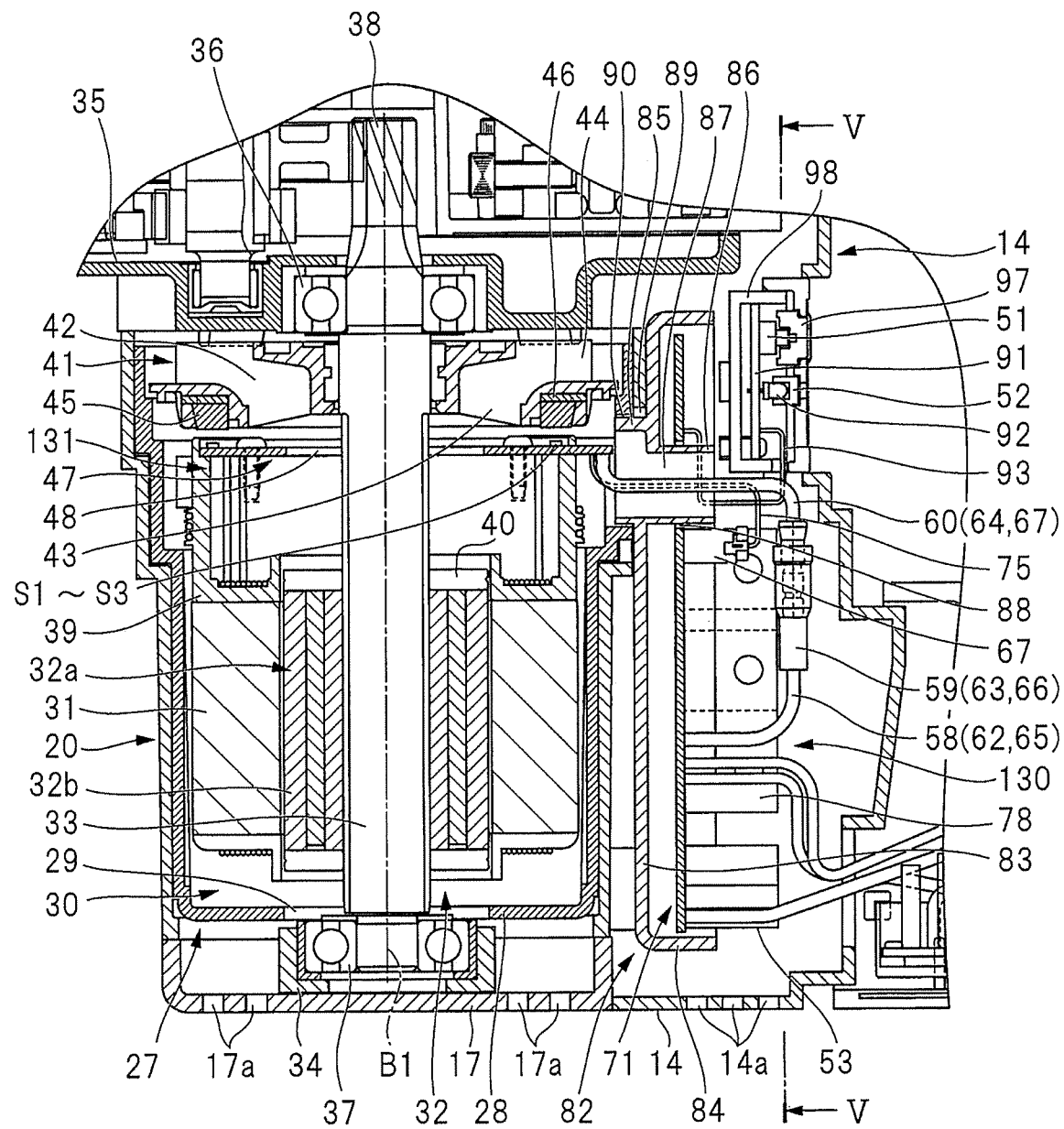
FIG. 3 is an enlarged cross-sectional front view showing a main portion of the electric working machine of FIG. 1.

An insulator 39 is provided in the motor case 27. The insulator 39 is disposed between the brushless motor 30 and the bearing 36 in the direction along the axial line B1. As shown in FIG. 3, the insulator 39 is provided with a shaft hole 40, and the output shaft 33 is disposed in the shaft hole 40. The insulator 39 is made of synthetic resin, and is provided in the motor case 27 so as to be fixed in the motor case 27. The insulator 39 is fixed to the stator 31.

A fan 41 is provided between the insulator 39 and the bearing 36 in the motor case 27. The fan 41 is fixed to and rotates with the output shaft 33, thus functioning to induce air outside of the working machine main body 12 into the working machine main body 12. For this function, the bottom cover 17 is provided with a hole 17a. The intermediate case 14 has a portion extending in the same direction as the bottom cover 17, the portion being provided with a hole 14a. The outside of the working machine main body 12 is communicated with the inside of the motor case 27 through the shaft hole 29 and the hole 17a. The outside of the working machine main body 12 is communicated with the inside of the intermediate case 14 through the hole 14a.

Hereinafter, a structure of the fan 41 which cools down the brushless motor 30 is described with reference to FIG. 3. The fan 41 is annular in shape, and is attached to the output shaft 33. In other words, the fan 41 rotates with the output shaft 33. The fan 41 is a centrifugal fan which transports air from the inside outward in a radial direction of the axial line B1, and the fan 41 has a plurality of blades spaced in a circumferential direction. Air passages 42 are formed between the blades. The air passages 42 are disposed centered on the axial line B1 in the radial direction, and extend from the inside outward; a suction inlet 43 is disposed on the inner radial portion, and a discharging outlet 44 is disposed on the outer radial portion. The fan 41 is made of non-magnetic synthetic resin, and the fan 41 is attached with a permanent magnet 45 and a magnetic member 46.

The magnetic member 46 may be made of iron or steel and is molded into a shape of an annular plate which extends in the radial direction of the fan 41. The permanent magnet 45 is an annular member centered on the axial line B1, in which north poles and south poles are alternately disposed along the circumferential direction of the permanent magnet 45.

A connection board 47 is provided in the motor case 27. The connection board 47 is fixed on, for example, the insulator 39. In other words, the connection board 47 is attached to the stator 31 via the insulator 39. The connection board 47 is disposed between the stator 31 and the permanent magnet 45 attached to the fan 41 in the direction along the axial line B1. The connection board 47 is provided with a hole 48 extending in a thickness direction of the connection board 47, and the output shaft 33 is disposed in the hole 48. The connection board 47 is made of non-magnetic material such as synthetic resin, and magnetic sensors S1 to S3 are mounted on the connection board 47. Additionally, the connection board 47 is provided with: a wiring to connect a coil U1 with a lead 60, a wiring to connect a coil V1 with a lead 64, and a wiring to connect a coil W1 with a lead 67. In the present invention, a second control unit 131 includes the connection board 47 and the magnetic sensors S1 to S3 mounted on the connection board 47.

Figure 2:
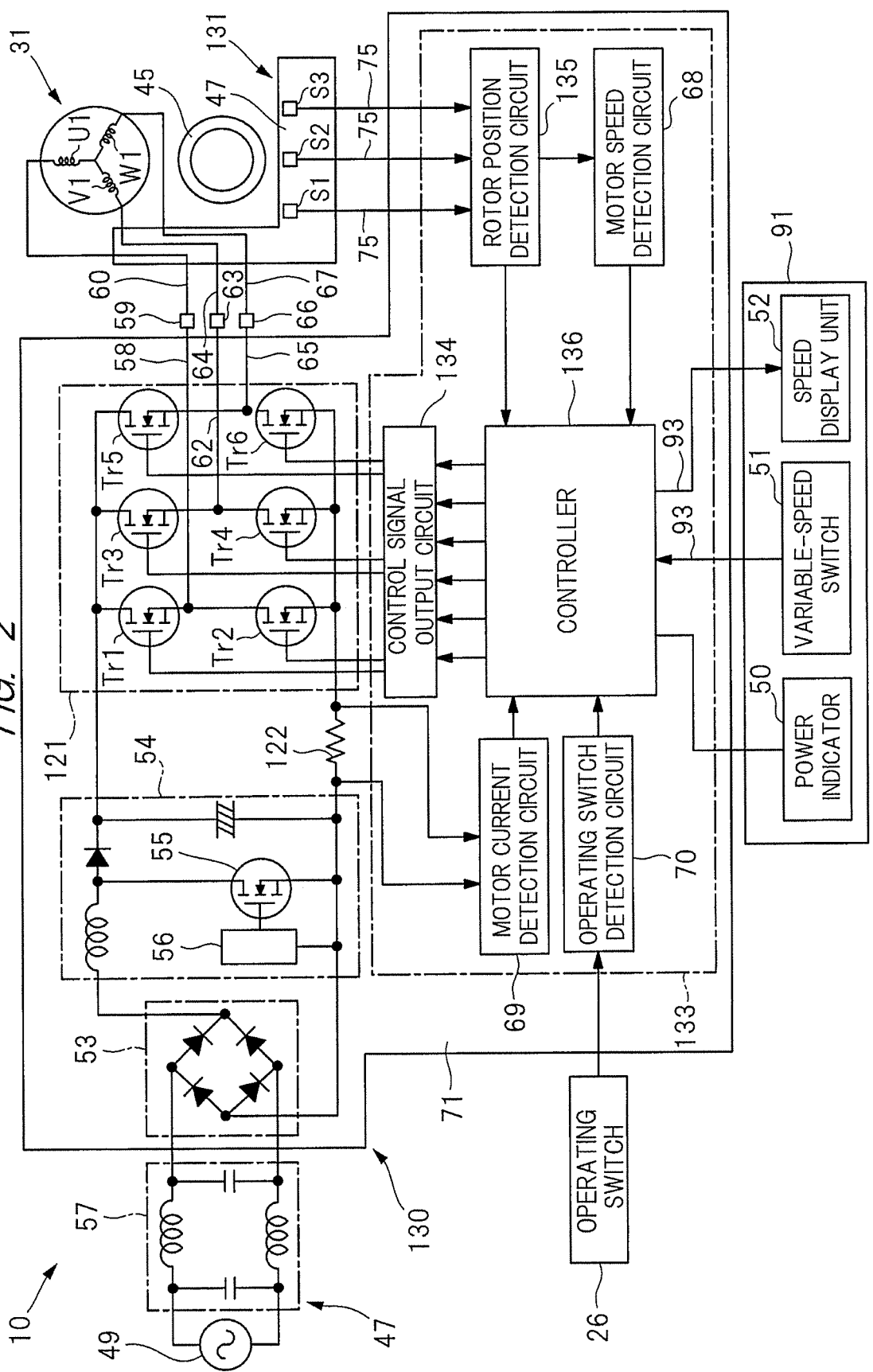
FIG. 2 is a block diagram showing a control circuit of the electric working machine of FIG. 1.

FIG. 2 is a block diagram showing a control circuit for controlling the electric working machine 10. The brushless motor 30 utilizes a commercial power supply 49 as a power source, and the electric power of the commercial power supply 49 is applied to the coils of the brushless motor 30 through the power cable 25. A power indicator 50 is provided in the intermediate case 14. The power indicator 50 lights up when the power cable 25 is connected to the commercial power supply 49. The electric working machine 10 comprises a variable-speed switch 51 which can set a target rotational speed of the brushless motor 30. The variable-speed switch 51 has multiple stages, such as four stages, of target rotational speeds; when the variable-speed switch 51 is operated, the target rotational speed can be switched among the stages. The electric working machine 10 also comprises a speed display unit 52 for displaying the stage of the target rotational speed of the brushless motor 30.

Additionally, the stator 31 of the brushless motor 30 includes coils U1, V1 and W1 which respectively correspond to U-phase, V-phase and W-phase, and four permanent magnets 32b which have opposite polarities are alternately disposed on a rotor core 32a. The three magnetic sensors S1 to S3 output detection signals indicative of a rotational position of the rotor 32. The three magnetic sensors S1 to S3 are respectively provided for coils U1, V1 and W1 of the three phases. The magnetic sensors S1 to S3 are non-contact sensors which respectively detect a magnetic force generated by the permanent magnet 45 attached to the fan 41, and respectively convert the magnetic force into electric signals to be transmitted. Hall elements may be utilized on the magnetic sensors S1 to S3.

The electric working machine 10 has an inverter circuit 121 to control currents to be respectively supplied to coils U1, V1 and W1. An electric circuit between the commercial power supply 49 and the inverter circuit 121 is provided with: a rectifier circuit 53 which rectifies an alternate current of the commercial power supply 49 to a direct current, and a power factor correction circuit 54 which raises the voltage of the rectified direct current and supplies the resulting voltage to the inverter circuit 121. The rectifier circuit 53 is constituted by diodes which are bridge-connected to each other. The power factor correction circuit 54 has an integrated circuit 56 which transmits a PWM control signal to a transistor 55 constituted by a field effect transistor or the like; the power factor correction circuit 54 suppresses a harmonic current generated by the switching elements in the inverter circuit 121 to be equal to or smaller than the limit value. Furthermore, a noise prevention circuit 57 is provided between the commercial power supply 49 and the rectifier circuit 53, so as to prevent noise generated by the inverter circuit 121 from being transmitted to the commercial power supply 49.

The inverter circuit 121 is a three-phase full-bridge inverter circuit, and has two switching elements Tr1 and Tr2 connected to each other, two switching elements Tr3 and Tr4 connected to each other, and two switching elements Tr5 and Tr6 connected to each other. The switching elements Tr1 and Tr2 are connected in parallel with each other, and are connected to a lead 58. A lead 60 is connected to the coil U1, and a connector 59 connects the lead 58 with the lead 60.

The switching elements Tr3 and Tr4 are connected in parallel with each other, and are connected to a lead 62. A lead 64 is connected to the coil V1, and a connector 63 connects the lead 64 with the lead 62. The switching elements Tr5 and Tr6 are connected in parallel with each other, and are connected to a lead 65. A lead 67 is connected to the coil U1, and a connector 66 connects the lead 67 with the lead 65.

The switching elements Tr1, Tr3 and Tr5 are connected to an output terminal on an anode side of the power factor correction circuit 54. The switching elements Tr2, Tr4 and Tr6 are connected to a terminal on a cathode side of the power factor correction circuit 54 through a current detection resistor 122.

In this manner, the three switching elements Tr1, Tr3 and Tr5 connected to the anode side of the power factor correction circuit 54 are positioned on a high side of an electrical potential, and the three switching elements Tr2, Tr4 and Tr6 connected to the cathode side of the power factor correction circuit 54 are positioned on a low side of the electrical potential. The coils U1, V1 and W1 interconnect to form a star connection.

Moreover, the connection of the coils U1, V1 and W1 may be a delta connection. For example, when a control signal is transmitted to a gate of the switching element Tr1 on the high side and a gate of the switching element Tr4 on the low side, electric currents are supplied to the U-phase coil U1 and the V-phase coil V1. By controlling ON/OFF timing and ON periods of the respective switching elements Tr1 to Tr6, a commutation for the coils U1, V1 and W1 are respectively controlled.

Control signals which control the inverter circuit 121 are computed and transmitted by a motor control unit 133. The motor control unit 133 comprises a controller 136, a control signal output circuit 134, a rotor position detection circuit 135, a motor speed detection circuit 68, a motor current detection circuit 69, and an operation switch detection circuit 70. Detection signals of the magnetic sensors S1 to S3 are transmitted to the rotor position detection circuit 135. The rotor position detection circuit 135 detects the rotational position of the rotor 32. The rotational position of the rotor 32 corresponds to a positional phase in the rotational direction of the rotor 32; the rotational position of the rotor 32 has a positional relationship or an angle between a reference position in the rotational direction predetermined by a fixed element, such as the stator 31, and a reference position determined by the rotational direction of the rotor 32.

The rotor position detection circuit 135 processes a signal indicative of the rotational position of the rotor 32. A signal processed by the rotor position detection circuit 135 is transmitted to the controller 136 and the motor speed detection circuit 68. The motor speed detection circuit 68 detects a motor speed, and a signal provided from the motor speed detection circuit 68 is transmitted to the controller 136.

The motor current detection circuit 69 is connected to both ends of the current detection resistor 122, and detects a current flowing through the brushless motor 30. A signal provided from the motor current detection circuit 69 is transmitted to the controller 136. The controller 136 has a microprocessor for processing control signals and memory; the memory stores control programs, operation formulas, data, and the like. The controller 136 processes the signal transmitted from the motor speed detection circuit 68, and computes an actual rotational speed of the rotor 32. A signal processed by the controller 136 is transmitted to the control signal output circuit 134, and the inverter circuit 121 is controlled by a control signal transmitted from the control signal output circuit 134.

In the present invention, a first control unit 130 is provided and includes a control board 71; the motor control unit 133, the rectifier circuit 53, the power factor correction circuit 54, the inverter circuit 121, and the current detection resistor 122 are mounted on the control board 71. Wirings are mounted on the control board 71 to mutually connect electric or electronic parts, such as the motor control unit 133, the rectifier circuit 53, the power factor correction circuit 54, the inverter circuit 121, and the current detection resistor 122.

The control board 71 is disposed outside of the motor housing 20 and inside of the intermediate case 14. The control board 71 is disposed outside of the motor housing 20 in the radial direction of the axial line B1. The control board 71 is disposed between the motor housing 20 and the handle 15 in the direction along the axial line A1. The thickness direction of the control board 71 is the same as the radial direction of the axial line B1.

The control board 71 is integrally molded and is made of insulating material such as synthetic resin. An arrangement region of the control board 71 in the direction along the axial line B1 partially overlaps the arrangement region of the motor housing 20 in the direction along the axial line B1. Additionally, signal lines 75 individually transmit the signals of the magnetic sensors S1 to S3 to the rotor position detection circuit 135.

Figure 5:
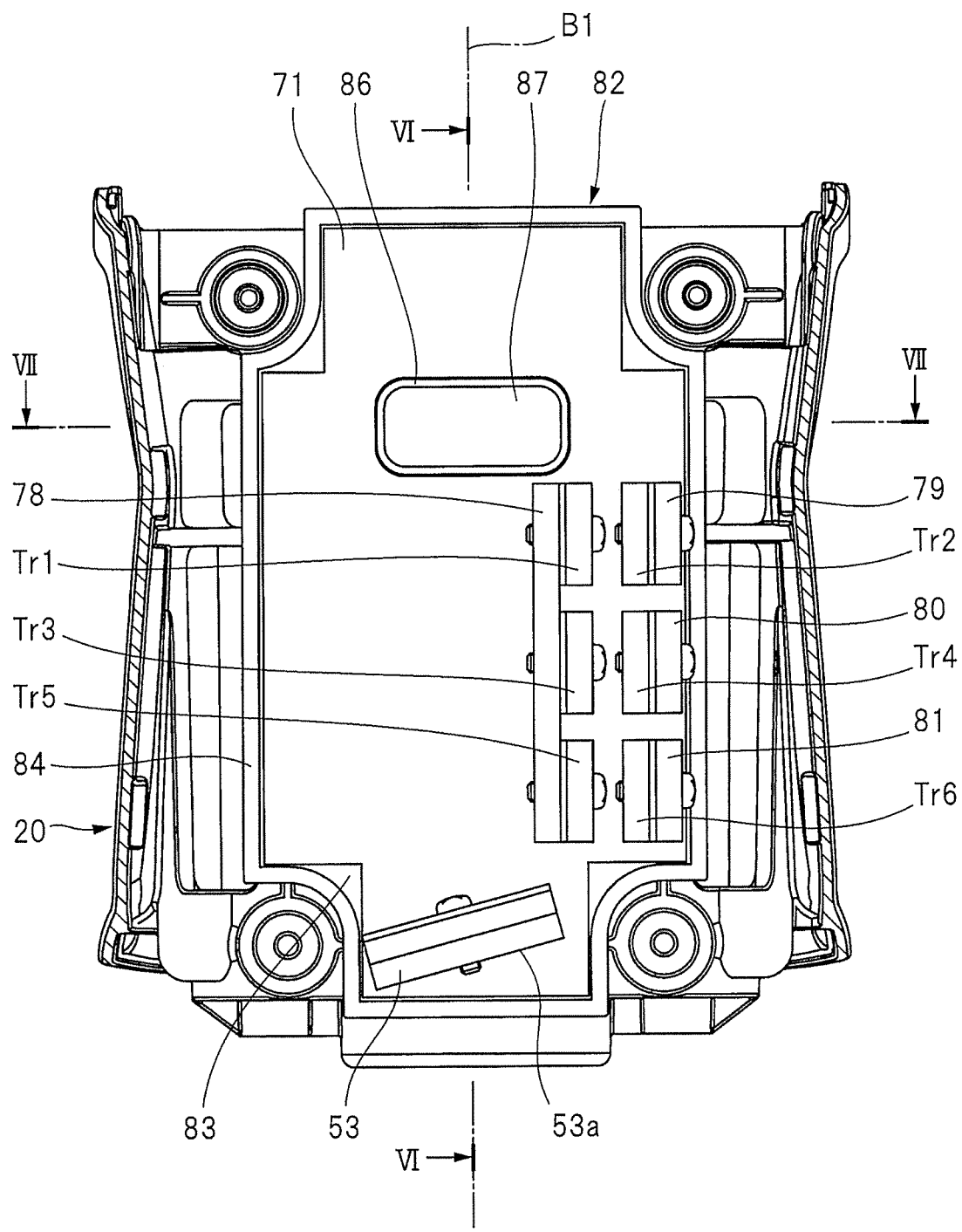
FIG. 5 is a right-side cross-sectional view taken along a line V-V of FIG. 3.

As shown in FIG. 5, a heat sink 78 is mounted on the control board 71 and is in contact with the switching elements Tr1, Tr3 and Tr5. The control board 71 is further provided with: a heat sink 79 in contact with the switching element Tr2, a heat sink 80 in contact with the switching element Tr4, and a heat sink 81 in contact with the switching element Tr6. The heat sinks 79, 80 and 81 are mounted on the control board 71. Each heat sink 78 to 81 is integrally molded and is made of thermo-conductive metals such as aluminum or copper, and by transferring the heat of the switching elements Tr1 to Tr6 to air, the heat sinks 78 to 81 cools the switching elements Tr1 to Tr6.

As shown in FIG. 3, the rectifier circuit 53 mounted on the control board 71 is disposed between the heat sink 78 and the bottom cover 17, in the direction along the axial line B1. When seen in a side view of the control board 71 as shown in FIG. 5, an arrangement region of the rectifier circuit 53 partially overlaps the axial line B1. Moreover, as shown in FIG. 5, arrangement regions of the switching elements Tr1 to Tr6 do not extend to the axial line B1. Furthermore, a lower surface 53a of the rectifier circuit 53 is flat, and the lower surface 53a is inclined relative to the axial line B1. The lower surface 53a is inclined toward the switching element Tr5.

In addition, a board case 82 is provided outside of the motor housing 20. The control board 71 is attached to the board case 82. The board case 82 has a tray-shape and includes a bottom portion 83, and side walls 84 formed on the peripheral portion of the bottom portion 83. The board case 82 is integrally molded and is made of insulating material such as synthetic resin. The control board 71 is disposed in a space surrounded by the side walls 84, and is in parallel with the bottom portion 83.

Figure 4:
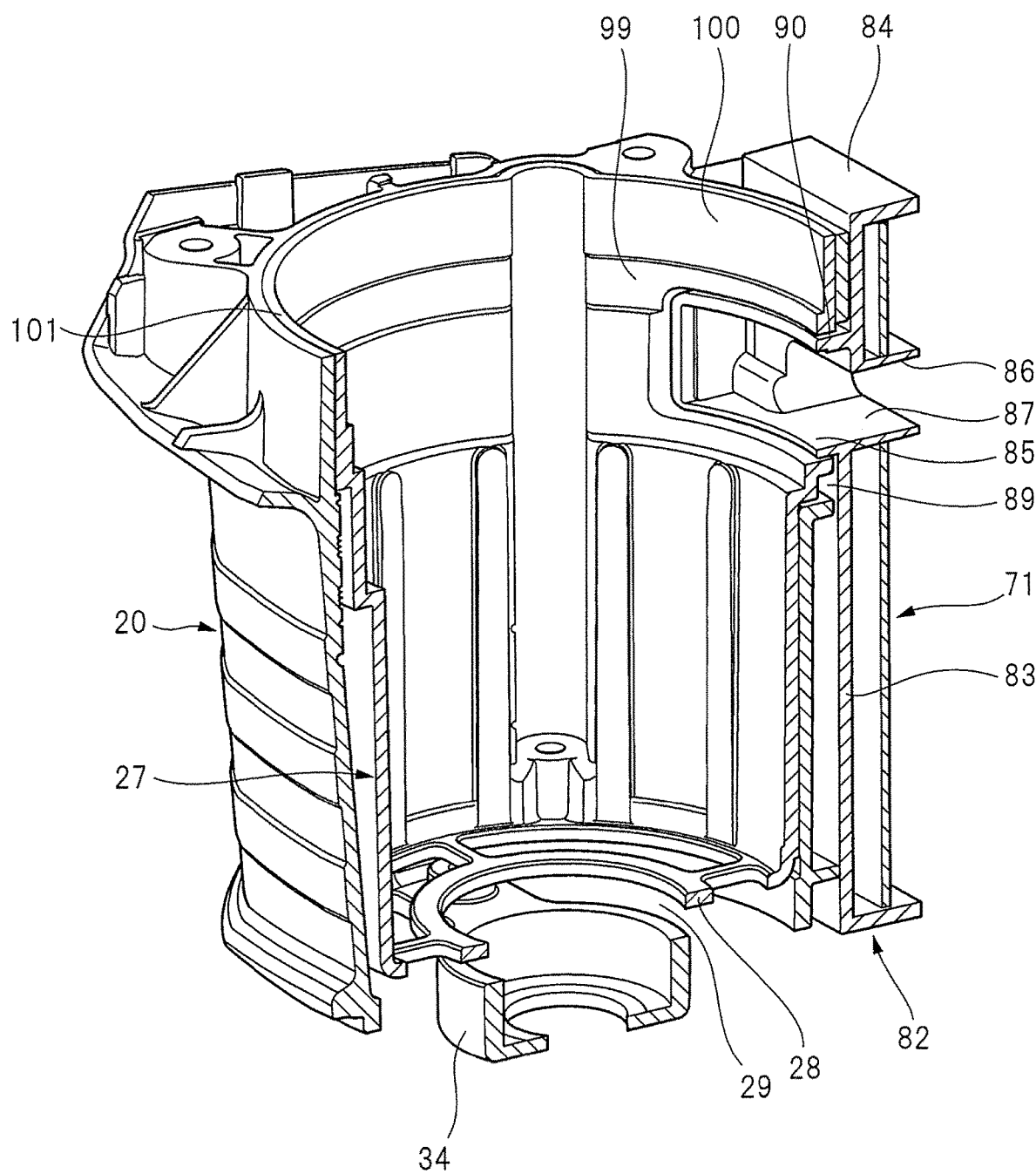
FIG. 4 is a perspective view showing a motor housing and a motor case of FIG. 3 cut in a longitudinal direction.
Figure 7:
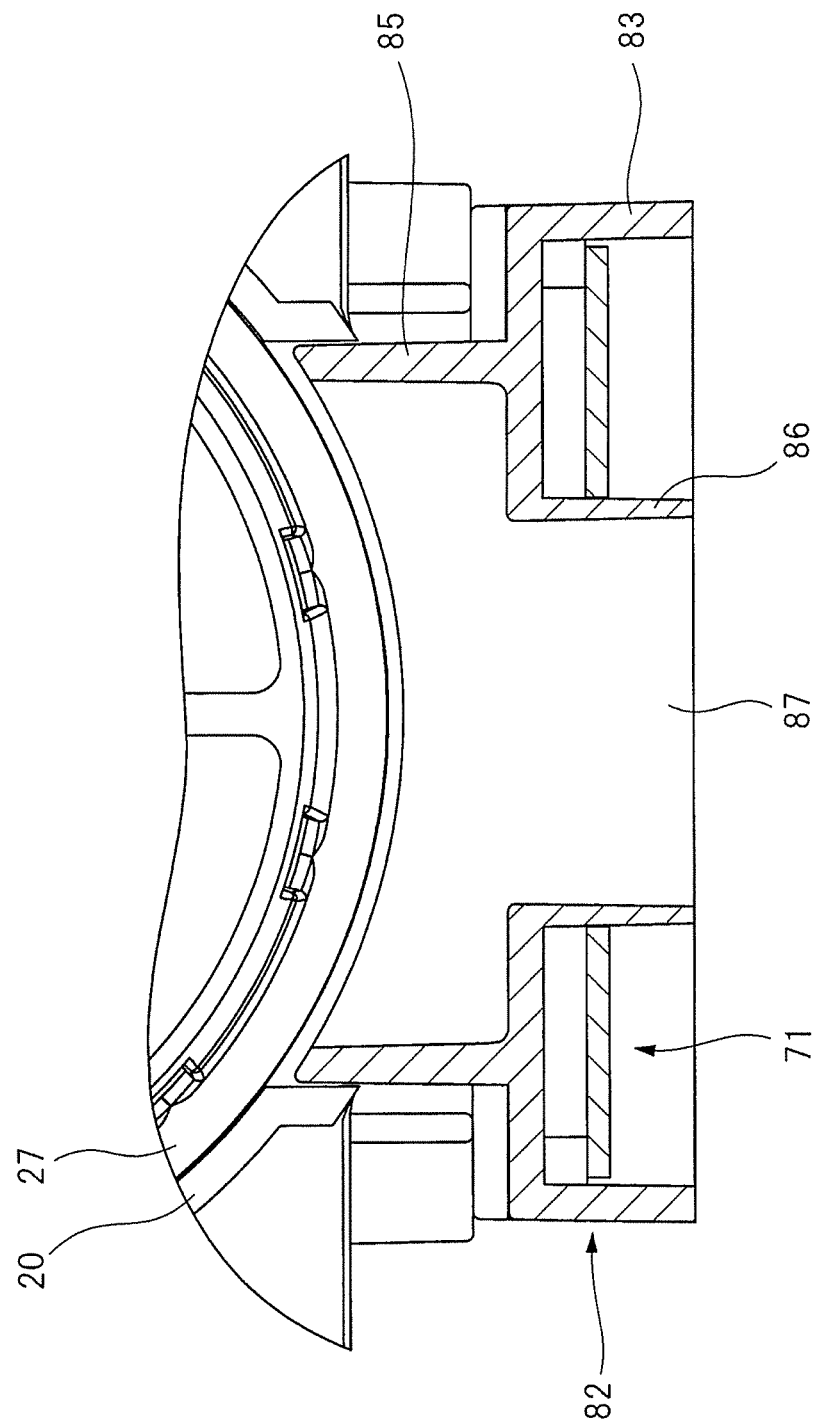
FIG. 7 is a cross-sectional plan view taken along a line VII-VII of FIG. 5.
Figure 8:
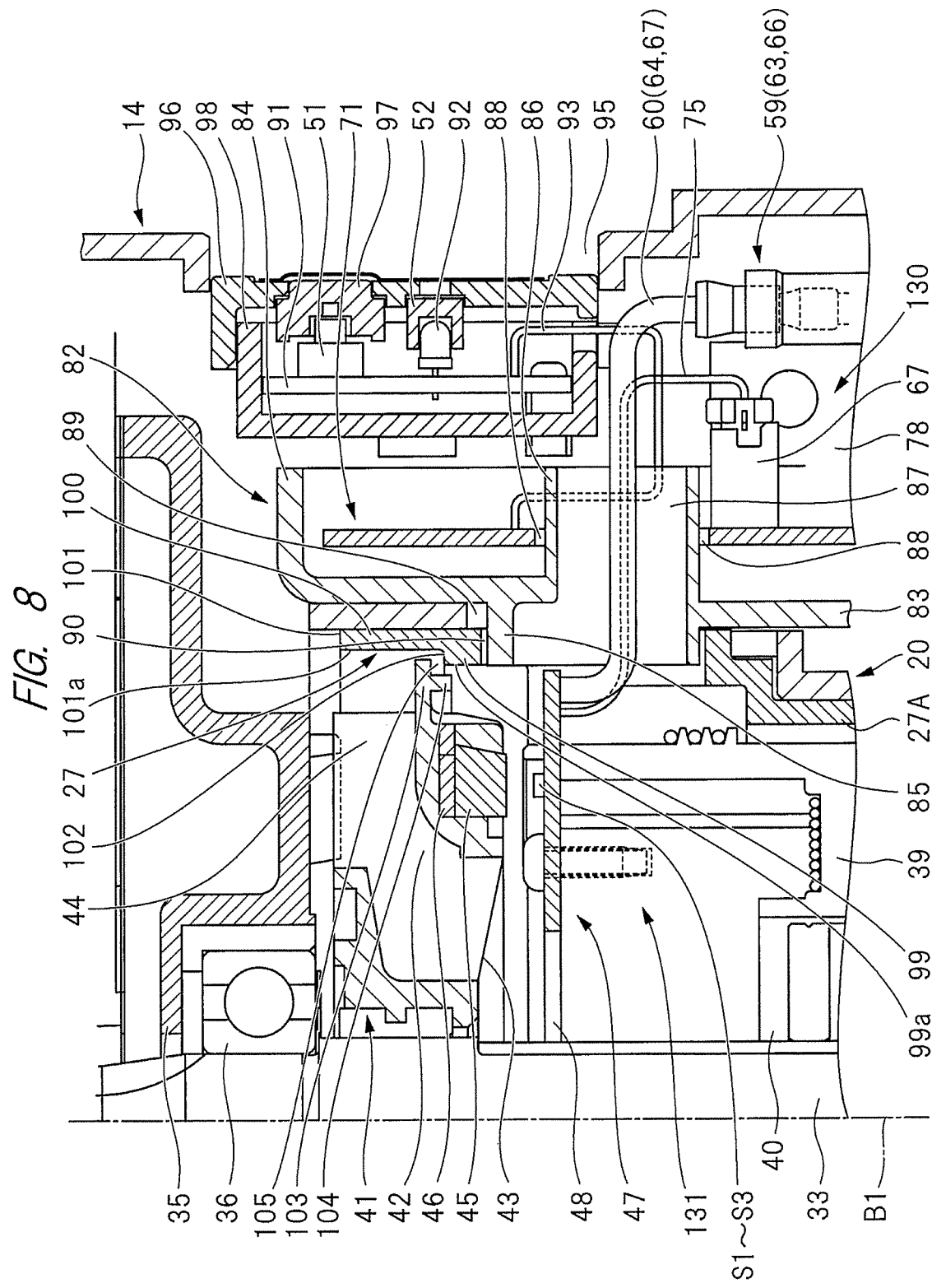
FIG. 8 is an enlarged cross-sectional front view showing a main portion of FIG. 3.

The bottom portion 83 is provided with a first tubular portion 85 and a second tubular portion 86, in which the first tubular portion 85 extends to the second tubular portion 86. The first tubular portion 85 protrudes from the bottom portion 83 toward the motor housing 20, and the second tubular portion 86 protrudes in a direction opposite to a protruding direction of the first tubular portion 85. Additionally, as shown in FIGS. 3, 4 and 7, a passage 87 extends through the first tubular portion 85 and the second tubular portion 86. The second tubular portion 86 is disposed in the space surrounded by the side walls 84. As shown in FIG. 8, the control board 71 is provided with a through hole 88 which extends in the thickness direction, and the second tubular portion 86 is disposed in the hole 88. An arrangement region of the connection board 47 partially overlaps an arrangement region of the passage 87 in the direction along the axial line B1.

The motor housing 20 is provided with a through hole 89, and the tubular portion 27A of the motor case 27 is provided with a through hole 90. Arrangement positions of the holes 89 and 90 partially overlap each other in the direction along the axial line B1, and the arrangement positions partially overlap in a circumferential direction of the axial line B1. Moreover, the first tubular portion 85 is disposed in the holes 89 and 90. Therefore, the outside of the motor housing 20 is communicated with the inside of the motor case 27 by the passage 87. Furthermore, the leads 60, 64 and 67 and the signal lines 75 are disposed through the passage 87.

Additionally, a circuit board 91 is provided in the intermediate case 14, and a variable-speed switch 51 and an LED lamp 92 are mounted on the circuit board 91. The LED lamp 92 is disposed on the rear surface of the speed display unit 52. The circuit board 91 is disposed in a more outward position than the board case 82 in the radial direction of the axial line B1. An electric wire 93 connects the circuit board 91 with the control board 71. The intermediate case 14 has an opened window portion 95, and the window portion 95 is covered by a cover 96. The cover 96 is integrally molded and is made of transparent synthetic resin. A speed switch button 97 is attached to the cover 96, and when the user operates the speed switch button 97, the variable-speed switch 51 is operated so that a target rotational speed is switched. The circuit board 91 is held in the intermediate case 14 by a circuit board holder 98.

Arrangement regions of the circuit board holder 98 and the circuit board 91 partially overlap arrangement regions of the output shaft 33 and the control board 71 in the direction along the axial line B1. Additionally, arrangement regions of the circuit board holder 98 and the circuit board 91 are disposed between a vibration damping mechanism 124 and the switching elements Tr1 to Tr6 in the direction along the axial line B1.

As shown in FIG. 8, the tubular portion 27A has a thick portion 99 and a thin portion 100 which are disposed at locations different from each other in the direction along the axial line B1. The thick portion 99 and the thin portion 100 are disposed between the hole 90 and an opening end 101 of the tubular portion 27A in the direction along the axial line B1. Moreover, the thin portion 100 is disposed between the thick portion 99 and the opening end 101 in the direction along the axial line B1. The thick portion 99 and the thin portion 100 are molded into annular shapes and are provided over an entire periphery of the tubular portion 27A, and the thick portion 99 is thicker than the thin portion 100 in the radial direction of the axial line B1. An inner peripheral surface 100a of the thin portion 100 and an inner peripheral surface 99a of the thick portion 99 are mutually connected by a step surface 102.

The fan 41 has an outer peripheral surface, and a flange 103 is provided over the entire peripheral surface. The flange 103 is provided within an arrangement region of the thin portion 100 in the direction along the axial line B1. An outer diameter of the flange 103 is less than an inner diameter of the thin portion 100, and is greater than an inner diameter of the thick portion 99. Additionally, the fan 41 is provided with a rib 104 which extends from an end face of the flange 103 toward the connection board 47 in the direction along the axial line B1. The rib 104 is molded into an annular shape centered on the axial line B1, and an outer diameter of the rib 104 is less than the inner diameter of the thick portion 99. The rib 104 has a tip in the direction along the axial line B1, and the tip is disposed in the thick portion 99 in the radial direction of the axial line B1. In addition, the thick portion 99 and the thin portion 100 form a minor gap 105 along with the flange 103 and the rib 104. The minor gap 105 has a crank-like shape along a plane which includes the axial line B1.

The following describes a power conversion mechanism 120 in which a rotational force of the output shaft 33 in the brushless motor 30 is converted into a reciprocating operation force of the piston 23. A crankshaft 106 is rotatably provided in the intermediate case 14. The crankshaft 106 is in parallel with the output shaft 33, and a driven gear 107 provided on the crankshaft 106 is meshed with the driver gear 38. A crank pin 108 is eccentrically attached to the crankshaft 106.

Moreover, a connecting rod 109 power-transmittably connects the crank pin 108 with the piston 23. Thus, when the rotational force of the output shaft 33 is transmitted to the crankshaft 106 so that the crank pin 108 is revolved, the piston 23 is reciprocatively moved in the cylinder 18. The power conversion mechanism 120 includes the crankshaft 106, the crank pin 108, and the connecting rod 109.

The following describes a mechanism in which the rotational force of the output shaft 33 is converted into the rotational force of the cylinder 18. The rotational force transmitting shaft 110 is rotatably provided in the cylinder housing 13, and a driven gear 111 is provided in the rotational force transmitting shaft 110. The driven gear 111 is meshed with a driver gear 112 of the crankshaft 106. The rotational force transmitting shaft 110 is rotatably supported by bearings 113 and 114. Therefore, the rotational force of the output shaft 33 is transmitted to the rotational force transmitting shaft 110 through the crankshaft 106. Additionally, a bevel gear 115 is attached to the rotational force transmitting shaft 110.

On the other hand, a cylindrical bevel gear 116 is disposed on an outer periphery of the cylinder 18, and the bevel gear 116 is rotatable about the cylinder 18. The bevel gear 116 is meshed with the bevel gear 115. A sleeve 117, which is integrally rotated with the cylinder 18 and is movable in the direction along the axial line A1, is disposed on the outer periphery of the cylinder 18. The electric working machine 10 is provided with a mode switching dial 123, and when the user operates the mode switching dial 123, the sleeve 117 moves in the direction along the axial line A1. Moreover, a clutch mechanism engages the sleeve 117 with the bevel gear 116, or releases them from each other.

When the sleeve 117 moves along the axial line A1 relative to the cylinder 18, the sleeve 117 is either power-transmittably engaged with the bevel gear 116, or is released from the bevel gear 116. When the sleeve 117 is engaged with the bevel gear 116, a rotational force of the rotational force transmitting shaft 110 is transmitted to the bevel gear 116. In contrast, when the sleeve 117 is released from the bevel gear 116, no rotational force of the rotational force transmitting shaft 110 is transmitted to the cylinder 18.

Inside the intermediate case 14, the vibration damping mechanism 124 is provided between the power conversion mechanism 120 and the handle 15 in the direction along the axial line A1. The vibration damping mechanism 124 is provided with a weight 126, and the weight 126 swings with a support shaft 125 serving as a fulcrum. The weight 126 swings within a predetermined angle range along a plane direction of the axes A1 and B1. An arrangement region of the vibration damping mechanism 124 partially overlaps an arrangement region of the brushless motor 30 and the arrangement region of the control board 71 in the direction along the axial line A1.

The following describes a usage example for the above-mentioned electric working machine 10. When the user operates the lever 132 so that the operation switch 26 is turned ON or OFF, an ON or OFF signal processed by the operation switch detection circuit 70 is transmitted to the controller 136. When the ON signal is transmitted to the controller 136, the control signal output circuit 134 processes a control signal which is transmitted to the inverter circuit 121, and the switching elements Tr1 to Tr6 are individually turned ON and OFF so that the currents successively flow through the respective coils U1, Y1 and W1. Then the coils U1, Y1 and W1 and the permanent magnets 32b cooperate with each other to generate a rotating magnetic field to rotate the rotor 32 of the brushless motor 30.

The controller 136 executes controls in which the actual rotational speed of the rotor 32 approaches the target rotational speed. The actual rotational speed of the rotor 32 is controlled by adjusting voltages which are applied to the respective coils U1, V1 and W1. More specifically, the control is executed by adjusting a duty ratio of the ON signals which are respectively applied to gates of the switching element Tr1 to Tr6 in the inverter circuit 121.

When the rotor 32 of the brushless motor 30 rotates, the power conversion mechanism 120 converts the rotational force of the output shaft 33 into the reciprocating operation force of the piston 23 so that the piston 23 is reciprocatively moved in the cylinder 18.

When the piston 23 is moved in a direction toward the crankshaft 106, the pressure of the air chamber 24 is lowered, and the hammering element 22 moves away from the intermediate hammering element 21. When the hammering element 22 moves away from the intermediate hammering element 21, air is unable to be drawn into the air chamber 24. After the piston 23 reaches a top dead center, the piston 23 moves from the top dead center toward a bottom dead center; thus pressure in the air chamber 24 rises. The hammering element 22 then strikes the intermediate hammering element 21. A striking force applied to the intermediate hammering element 21 is then transmitted to a target through the tip tool 11. The hammering element 22 reciprocatively moves in the cylinder 18 while the output shaft 33 of the brushless motor 30 is rotating; thus the hammering element 22 intermittently strikes the intermediate hammering element 21.

When the reciprocating movements of the piston 23 and the intermittent striking of the intermediate hammering element 21 on to the hammering element 22 cause the working machine main body 12 to vibrate in the direction along the axial line A1, the weight 126 swings with the support shaft 125 serving as a fulcrum; thus the vibration of the working machine main body 12 is reduced.

On the other hand, the rotational force of the output shaft 33 of the brushless motor 30 is transmitted to the rotational force transmitting shaft 110 through the driver gear 112. When the mode switching dial 123 is operated to select a hammer-and-rotate mode, the rotational force of the rotational force transmitting shaft 110 is transmitted to the cylinder 18, and the cylinder 18 is rotated. The rotational force of the cylinder 18 is transmitted to the tip tool 11 through the tool holding member 19. In this manner, the electric working machine 10 transmits the striking force and the rotational force to the tip tool 11. In contrast, when the mode switching dial 123 is operated to select a hammer mode, no rotational force of the rotational force transmitting shaft 110 is transmitted to the cylinder 18.

Moreover, the fan 41 rotates when the output shaft 33 of the brushless motor 30 rotates so that air outside of the working machine main body 12 can flow through the hole 17a and the shaft hole 29, and then can be drawn into the motor case 27. The heat of the brushless motor 30 is then transmitted into air so that the brushless motor 30 is cooled. Moreover, the air outside of the motor housing 20 is induced into the intermediate case 14 through the hole 14a. Therefore, the heat of the rectifier circuit 53 and the switching elements Tr1 to Tr6 are transmitted to air. Thus, the temperature of the rectifier circuit 53 and the switching elements Tr1 to Tr6 is suppressed from rising.

Since the air induced into the intermediate case 14 is directed to move in a direction along the lower surface 53a of the rectifier circuit 53, the amount of air to be made in contact with the switching elements Tr1 to Tr6 is increased to its maximum; thus, the switching elements Tr1 to Tr6 can be efficiently cooled. The air which removed the heat from the rectifier circuit 53 and the switching elements Tr1 to Tr6 then flows through the passage 87 and is induced into the motor case 27. The air drawn into the motor case 27 by the rotation of the fan 41 is then induced through air passages 42 into the intermediate case 14. The air is finally discharged through a passage (not shown) to the outside of the working machine main body 12.

The control board 71 in the electric working machine 10 of the present embodiment is disposed outside of the motor housing 20 in the radial direction of the axial line B1 of the output shaft 33. Therefore, the control board 71 can be disposed without being subjected to the limitation of the brushless motor 30, in particular, the limitation based on the length direction of the output shaft 33. Moreover, the working machine main body 12 can be prevented from growing in size in the direction along the axial line B1.

Furthermore, the outer diameter of the flange 103 of the fan 41 is larger than the inner diameter of the thick portion 99. Additionally, the thick portion 99 and the thin portion 100 form a minor gap 105 along with the flange 103 and the rib 104. The minor gap 105 has a crank-like shape and acts as a labyrinth seal. Therefore, the air is made to flow inward so that the air, which was discharged outward from the discharging outlet 44 by the centrifugal force of the fan 41, can flow through the minor gap 105. That is, a direction of the air flow is reversed, and the kinetic energy of air is reduced by a flow resistance; thus, the air discharged from the discharging outlet 44 can be prevented from returning to the arrangement region of the connection board 47.

As a result, an air flow, in which the air in the intermediate case 14 flows through the passage 87 into the motor case 27, can be prevented from blockages. The air which cooled down the control board 71 in the intermediate case 14 is thus prevented from stagnating in the intermediate case 14. Therefore, a cooling performance of the control board 71 can be prevented from decreasing.

Moreover, since the control board 71 is set in the direction along the axial line B1, the air induced into the intermediate case 14 from the hole 14a can then flow in the direction along the axial line B1. Therefore, the flow of air which had cooled down the control board 71 can be prevented of blockages.

Furthermore, the motor housing 20 is made of aluminum and disposed so as to protrude from the cylinder housing 13 in the direction along the axial line B1. Therefore, the strength of the motor housing 20 is secured so that when the electric working machine 10 is utilized and the motor housing 20 is made in contact with an object, the motor housing 20 can be prevented of deformation. Additionally, when vibrations caused by the reciprocating movements of the piston 23 and the striking movements of the hammering element 22 to the intermediate hammering element 21 are transmitted to the working machine main body 12, the motor housing 20 deflects against the cylinder housing 13, thus suppressing the vibration of the working machine main body 12.

Moreover, the arrangement region of the control board 71 partially overlaps the arrangement region of the vibration damping mechanism 124 in the direction along the axial line A1. For this reason, when the control board 71 is disposed outside of the motor housing 20, an arrangement region for the sole purpose of setting the control board 71 does not need to be provided, and the electric working machine 10 can be prevented from growing in size in the direction along the axial line A1. Furthermore, a region is secured in the direction along the axial line A1 in the intermediate case 14, in which the weight 126 is allowed to swing. A portion of an arrangement region of the first control unit 130 in the direction along the axial line A1 partially overlaps a portion of a swinging region for the weight 126. Therefore, the electric working machine 10 is prevented from growing further in size in the direction along the axial line A1.

In addition, the noise prevention circuit 57 is provided in the handle 15, and the first control unit 130 is disposed in a dead space formed between the brushless motor 30 and the noise prevention circuit 57 in the direction along the axial line A1. Therefore, the electric working machine 10 is further prevented from growing in size in the direction along the axial line A1.

The following describe correspondence between a structure of the present embodiment and a structure of the present invention: the brushless motor 30 corresponds to an electric motor of the present invention, the working machine main body 12 corresponds to a working machine main body of the present invention, the rotor 32 corresponds to a rotor of the present invention, and the stator 31 corresponds to a stator of the present invention. Moreover, the axial line B1 corresponds to a rotation axis of the present invention, and the motor housing 20 and the motor case 27 correspond to a tubular housing of the present invention. Furthermore, the first control unit 130 corresponds to a first control unit of the present invention.

The magnetic sensors S1 to S3 correspond to rotational position detection sensors of the present invention, and the second control unit 131 corresponds to a second control unit of the present invention. The leads 58, 60, 62, 64, 65 and 67 and the signal lines 75 correspond to electric wires of the present invention. The coils U1, V1 and W1 correspond to coils of the present invention, the permanent magnets 32b corresponds to permanent magnets of the present invention, and the fan 41 corresponds to a fan of the present invention. The control board 71 corresponds to a control board of the present invention, and the connection board 47 corresponds to the supporting board of the present invention. The magnetic member 46 corresponds to a magnetic member of the present invention, the bottom cover 17 and the bottom portion 28 correspond to a bottom portion of the present invention, and the hole 17a and the shaft hole 29 correspond to ventilation holes of the present invention.

Additionally, the shaft hole 29 corresponds to a first hole of the present invention, and the hole 17a corresponds to a second hole of the present invention. The motor housing 20 corresponds to an outer housing of the present invention, and the motor case 27 corresponds to an inner housing of the present invention. The board case 82 corresponds to a holder of the present invention, and the first tubular portion 85 and the second tubular portion 86 correspond to tubular portion of the present invention.

Additionally, the holes 89 and 90 correspond to holes of the present invention; the hole 90 corresponds to a first hole of the present invention, and the hole 89 corresponds to a second hole of the present invention. The thick portion 99, the thin portion 100 and the flange 103 correspond to a regulating mechanism of the present invention.

Furthermore, the piston 23 corresponds to an operation member of the present invention, and the axial line A1 corresponds to an operation center line of the present invention, the power conversion mechanism 120 corresponds to a power convertor of the present invention, the tip tool 11 corresponds to a tip tool of the present invention, and the hammering element 22 corresponds to a hammering element of the present invention.

The present invention is not limited to the above-mentioned embodiment, and can be variously modified without departing from the scope of the invention. For example, the electric working machine of the embodiment has a configuration in which power is supplied to the brushless motor from the commercial power supply, that is, an alternate current power supply. However, the electric working machine of the present invention includes an electric working machine in which a battery pack, serving as a direct current power supply, is attached to the working machine main body, and power of the battery pack is supplied to the brushless motor. The electric working machine of the present invention is any machine in which the tip tool is operated by a power of the electric motor.

The electric working machine of the present invention includes a structure in which the inverter circuit 121 is mounted on the connection board 47. The electric working machine of this structure is provided with electric wires which connect the inverter circuit 121 with the power factor correction circuit 54, and extend into the passage 87. Moreover, the wirings provided on the control board 71 or the connection board 47 include leads, printed circuits and printed wirings.

The electric working machine of the present invention includes a hammer drill and a hammer driver which apply a rotational force and a hammering force to the tip tool in the radial direction. The electric working machine of the present invention includes an impact driver and an impact drill which apply a rotational force and an impact force to the tip tool in a rotational direction. Moreover, the electric working machine of the present invention includes a driver, a drill, a grinder, and a sander which apply only the rotational force to the tip tool. The electric working machine of the present invention includes a hammer and a nailer which apply only the hammering force in the radial direction to the tip tool. The electric working machine of the present invention includes a jigsaw and a saber saw which reciprocatively move the tip tool. The electric wires of the present invention include leads through which electric currents flow and signal lines through which electric signals pass. The leads and signal lines have conductors coated by synthetic resin or rubber-like elastic bodies.

LIST OF REFERENCE SIGNS

10: electric working machine
11: tip tool
12: working machine main body
17: bottom cover
17a: hole
18: piston
20: motor housing
22: hammering element
27: motor case
28: bottom portion
29: shaft hole
30: brushless motor
31: stator
32: rotor
32b: permanent magnets
41: fan
46: magnetic member
47: connection board
53: rectifier circuit
54: power factor correction circuit
58, 60, 62, 64, 65 and 67: leads
71: control board
75: signal lines
82: board case
85: first tubular portion
86: second tubular portion
89 and 90: holes
99: thick portion
100: thin portion
103: flange
120: power conversion mechanism
121: inverter circuit
130: first control unit
131: second control unit
133: motor control unit
134: control signal output circuit
A1 and B1: axial lines
S1 to S3: magnetic sensors
U1, V1 and W1: coils

The invention claimed is:

1. An electric working machine comprising:
    a brushless motor including a rotor, an output shaft, and a stator;
    a tubular housing for the brushless motor, and comprising (1) a bottom portion having a bottom hole and (2) a side wall surrounding the brushless motor, the side wall having a through hole;
    a first control unit disposed outside the side wall of the tubular housing, the first control unit including (1) an inverter circuit to control current supplied to the brushless motor and (2) a controller to control the inverter circuit;
    a second control unit disposed inside the tubular housing, the second control unit including a sensing board to detect a rotational position of the rotor;
    an electric wire extending between the first control unit and the second control unit through the through hole to connect the first control unit to the second control unit; and
    a fan attached to the output shaft to generate an air flow flowing along an air flow path, the air flow path comprising:
        a first air flow path entering the tubular housing from the through hole;
        a second air flow path entering the tubular housing from the bottom hole; and
        a third air flow path exiting from the tubular housing, and wherein the first control unit is cooled by the air flow flowing along the air flow path.

2. The electric working machine according claim 1,
    wherein the bottom portion of the tubular housing has a bearing support to support a bearing that supports one end of the output shaft, and
    wherein the air flow along the second air flow path flows around the bearing support and enters the tubular housing from the bottom hole.

3. The electric working machine according claim 1, further comprising a case partially covering the tubular housing,
    wherein the case has a portion facing at least the bottom portion of the tubular housing, and wherein the portion of the case has one or more air suction holes through which the air flow along the first air flow path and the air flow along the second air flow path enter inside the case.

4. The electric working machine according claim 1, wherein the fan, the through hole, and the bottom hole are arranged in that order along the output shaft.

5. An electric working machine comprising:
- a brushless motor including a rotor, an output shaft, and a stator;
- a tubular housing for the brushless motor, the tubular housing comprising a side wall surrounding the brushless motor, the side wall having a through hole;
- a first control unit disposed outside the side wall of the tubular housing, the first control unit being housed in a board case and including (1) an inverter circuit to control current supplied to the brushless motor and (2) a controller to control the inverter circuit;
- a second control unit disposed inside the tubular housing, the second control unit including a sensing board to detect a rotational position of the rotor;
- an electric wire extending between the first control unit and the second control unit through the through hole to connect the first control unit to the second control unit; and
- a fan attached to the output shaft to generate an air flow flowing along an air flow path, the air flow path comprising:
  - an inlet air flow path entering the tubular housing from the through hole; and
  - an outlet air flow path exiting from the tubular housing,
wherein the board case is disposed on the outlet air flow path so that the air flow flows along the board case.

* * * * *